(12) United States Patent
Nelson (10) Patent No.: US 7,117,513 B2
(45) Date of Patent: Oct. 3, 2006

(54) APPARATUS AND METHOD FOR DETECTING AND CORRECTING A CORRUPTED BROADCAST TIME CODE

(75) Inventor: Daniel Nelson, Port Richey, FL (US)

(73) Assignee: Nielsen Media Research, Inc., New York, NY (US)

( * ) Notice: Subject to any disclaimer, the term of this patent is extended or adjusted under 35 U.S.C. 154(b) by 966 days.

(21) Appl. No.: 10/047,734

(22) Filed: Nov. 9, 2001

(65) Prior Publication Data

US 2003/0093783 A1    May 15, 2003

(51) Int. Cl.
H04H 9/00    (2006.01)
H03M 13/00   (2006.01)
G06F 11/00   (2006.01)

(52) U.S. Cl. .................. 725/20; 714/819; 714/799; 714/815

(58) Field of Classification Search ............. 714/815, 714/52, 48, 25, 724, 809, 799, 819; 380/6; 725/14, 20; 382/116
See application file for complete search history.

(56) References Cited

U.S. PATENT DOCUMENTS

| | | | |
|---|---|---|---|
| 4,905,080 A * | 2/1990 | Watanabe et al. ............. | 725/14 |
| 5,345,594 A | 9/1994 | Tsuda | |
| 5,432,558 A | 7/1995 | Kim | |
| 5,481,294 A * | 1/1996 | Thomas et al. .............. | 725/20 |
| 5,592,618 A | 1/1997 | Micka et al. | |
| 5,764,763 A | 6/1998 | Jensen et al. | |
| 5,771,307 A * | 6/1998 | Lu et al. ..................... | 382/116 |
| 6,647,548 B1 * | 11/2003 | Lu et al. ...................... | 725/20 |
| 6,807,230 B1 * | 10/2004 | Srinivasan .................. | 375/240 |

OTHER PUBLICATIONS

PCT International Search Report mailed on Feb. 13, 2003.
International Bureau, *International Preliminary Examination*, Mar. 16, 2006, 4 Sheets.

* cited by examiner

*Primary Examiner*—Guy Lamarre
*Assistant Examiner*—Fritz Alphonse
(74) *Attorney, Agent, or Firm*—Hanley, Flight & Zimmerman, LLC (57) ABSTRACT

An apparatus and method for processing audience measurement data detects and corrects one or more corrupted time codes. The corrupted time codes are identified by calculating a first set of intervals between a set of read times that may, but need not, be consecutive, each of which corresponds to one of the time codes extracted from a broadcast signal. The first set of intervals are compared to a second set of intervals between the time codes to identify when one or more of the second intervals do not meet a predetermined criteria. At least one of the time codes associated with each of the second intervals that do not meet the criteria is identified as being corrupted. The method used to calculate a corrected time code involves using the magnitude of the corresponding first interval to calculate the corrected time code.

68 Claims, 5 Drawing Sheets

APPARATUS AND METHOD FOR DETECTING AND CORRECTING A CORRUPTED BROADCAST TIME CODE

FIELD OF THE INVENTION

The invention relates generally to audience measurement systems, and more specifically, to an audience measurement apparatus that extracts time codes from a broadcast signal and then detects and corrects the time codes that are corrupted or erroneous.

BACKGROUND OF THE INVENTION

Ancillary identification codes are often added to broadcast radio and television programs for the purpose of enabling audience measurement. The ancillary identification codes, which are added at the time of program broadcast or creation, are subsequently accessed at a signal reception site to identify a program being viewed or heard at the signal reception site and for identifying the time at which the program is being viewed/heard. Systems for encoding video signals with ancillary identification codes have been in widespread use for decades. For examples of such systems refer to U.S. Pat. No. 5,425,100 to Thomas et al., incorporated herein by reference. Many of the video encoding systems are designed to take advantage of the rigid, periodic timing that is characteristic of video signals by adding the ancillary code at periodic intervals in one of the lines of the vertical blanking interval of a television signal. In contrast, audio encoding systems have become feasible more recently because of the greater difficulty in hiding a code in an audio signal that lacks the rigid, periodic timing of a video signal. Specifically, coding cannot be masked during periods of program silence such that the code cannot be inserted at regular intervals when one or more of the intervals coincide with periods of silence. As a result, audio encoding systems typically do not add identification codes to a program at strictly periodic intervals.

To enable audience measurement, conventional broadcast identification codes begin with a synchronization or start-of-message field which allows a decoder to detect and lock onto the code, followed by a source identification (SID) field that identifies the source of the broadcast program. A time code field containing a characteristic time, such as a time of initial dissemination of the broadcast from a network feed site to affiliated local stations, follows the SID field. Other fields may contain additional data.

A household site selected for audience measurement may decode a broadcast program signal to obtain the time codes and SIDs embedded therein. The time codes and SIDs are stored at the household site and subsequently transmitted to a central facility for reconciliation with an activity log that identifies the broadcast activity of a set of identified sources relative to a set of time codes. Thus, the time codes and SIDs received from a household site are compared to the activity log to identify the programs that have been viewed/heard at the household site.

However, the time codes extracted from the time code fields may be insufficient to enable identification of the time at which a program was viewed. Specifically, a delay may occur between a time that a program is encoded and a time when the same program is aired. Specifically, a network may encode a program with an SID unique to the network and with a time code equal to a standard clock time at which the program is initially distributed to affiliated local broadcasters by a satellite distribution system. The local broadcasters may either transmit the program immediately or store the program for hours or even days before airing the program. As a result, the time code embedded into the broadcast signal may have no relation to the actual local time at which the program is broadcast to viewers/listeners. Similarly, VCR technology permits viewers to record broadcast programs for later viewing of the recorded program off-air thereby also causing a shift between the time code embedded in the signal and the actual local clock time at which the program is viewed.

To compensate for the potential time delay that may occur between program encoding and program broadcast, the household site is additionally configured to record a set of read times that represent the actual, local times at which a broadcast program is being decoded for viewing/listening. More specifically, a read time is obtained from a local clock for each instance that a time code is detected/decoded in the programming signal being viewed/heard.

Unfortunately though, the data collection performed by an audience measurement system such as the household site described above is not error free. Specifically, decoder error may occasionally cause one or more of the extracted identification code bits to be erroneously decoded. Generally, the probability that a time code bit will be incorrectly decoded increases monotonically with the temporal spacing of the code bit from the synchronization field. As a result, an accurately decoded SID does not guarantee that the associated time code bits have been decoded error free. In addition to decoder errors, the audience measurement system may encounter time intervals during which no code can be read—either because none was added to the signal initially or because of signal transmission and distribution artifacts that degrade or accidentally erase the code. Poor signal reception may further exacerbate data collection errors.

In addition to the decoder errors discussed above, audience measurement systems designed to collect time codes from audio signals are also prone to data collection errors associated with using a microphone to receive the signal to be decoded. Specifically, despite dramatic advancements in the art that have enabled the inaudible burying of a time code within an audio signal and that have further enabled the retrieval of the same code at a reception site, a time code cannot be reliably extracted from an inevitably degraded signal picked up with a microphone.

Unfortunately, prior art systems designed to overcome such data collection errors are often computationally expensive and require complex processing equipment that can be costly and difficult to maintain and repair. For example, U.S. Pat. No. 5,481,294 to Thomas et al. discloses a measurement system that uses a computationally expensive feature recognition system to back-up a code reading system.

As a result, there is a need in the art for an audience measurement system that overcomes one or more of the foregoing data collection errors.

SUMMARY OF THE INVENTION

In accordance with one aspect of the invention, an apparatus for processing audience measurement data includes a data input port for receiving a plurality of data records and a processor that is coupled to the data input port. The data records each contain a time code retrieved from a broadcast signal and a read time that corresponds to the time code. The read times correspond to the time codes such that a set of first intervals between the read times are mathematically related to a corresponding set of second intervals between the time codes when the time codes are not corrupted. The processor determines the magnitudes of the first and second intervals, compares the magnitudes of the first and second intervals to identify one or more of the time codes that are corrupted and one or more of the time codes that are not corrupted, and to calculate a corrected time code for each time code that is corrupted.

In accordance with another aspect of the invention, a method for identifying and correcting one or more of a plurality of time codes extracted from a broadcast signal includes the step of recording a set of read times, each of which corresponds to one of the time codes, and each of which indicates when the corresponding time code was extracted from the broadcast signal. In addition, the method includes the steps of determining a set of first intervals between the read times, determining a set of second intervals between the time codes, each of the second intervals corresponding to one of the first intervals, comparing each of the first intervals to each corresponding second interval to determine whether each first interval and corresponding second interval are approximately equal. The method further includes identifying a subset of the second intervals that are not approximately equal to a corresponding subset of the first intervals based on the result of comparing, wherein each of the subset of second intervals is associated with at least one corrupted time code, and calculating a corrected time code for the corrupted time code.

In accordance with yet another aspect of the present invention, a storage medium stores software that detects and corrects one or more of a plurality of time codes extracted from a broadcast signal. The software is computer readable and includes instructions for causing a computer to receive a set of time codes and receive a set of read times that each correspond to one of the time codes, and that indicate when the corresponding time code was extracted from a broadcast signal. The software further includes instructions for causing a computer to calculate a set of first intervals between the read times, calculate a set of second intervals between the time codes, wherein each of the second intervals corresponds to one of said first intervals, compare each of the first intervals to each corresponding second interval to determine whether the first intervals are approximately equal to the corresponding second intervals. The software instructions further cause the computer to identify a subset of the second intervals that are not approximately equal to a corresponding subset of the first intervals based on a result of the comparison, wherein the identified subset of second intervals are each associated with at least one corrupted time code, and cause the computer to calculate a corrected time code for the corrupted time code.

In accordance with still another aspect of the present invention, an apparatus for processing audience measurement data includes a means for receiving a plurality of time codes extracted from a broadcast signal, means for recording a plurality of read times, each corresponding to one of said time codes, a means for calculating a set of first intervals between the read times by determining a difference between two of the read times and a means for calculating a set of second intervals between the time codes, by determining a difference between two of the time codes. Each of the second intervals corresponds to one of the first intervals. The apparatus further includes a means for comparing each of the first intervals to each of the corresponding second intervals to determine whether one or more of the time codes are corrupted.

According to a further aspect of the present invention, the apparatus further includes a means for calculating a corrected time code for at least one of the two time codes used to calculate each of the subset of second intervals. The means for calculating a corrected time code may include a means for adding one of the first intervals to one of the time codes, wherein the first interval to be added to one of the time codes corresponds to one of the second intervals included in the subset of second intervals.

According to a still further aspect of the present invention, an apparatus for processing audience measurement data, such as a plurality of time codes and a plurality of read times that correspond to the time codes, includes an input port for receiving a plurality of data records and a processor. Each data record includes one of the time codes and the corresponding read time, and the processor determines when the time codes and the corresponding read times are time locked such that a first time code and a first read time included in a first data record have increased by an approximately equal amount relative to a second read time and a second time code included in a second data record, wherein the first data record is received at the input port later than the second data record. The processor also determines when the time codes and the corresponding read times are not time locked such that a third time code and a third read time included in a third data record have not increased by an approximately equal amount relative to a fourth read time and a fourth time code included in a fourth data record. The third data record is received at the input port later than the fourth data record. The processor further determines when the time codes and the read times experience one or more transitions between being time locked and not being time locked and use the transitions to identify one or more of the time codes that are corrupted. In addition, the processor calculates one or more corrected time codes for the corrupted time codes.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

An apparatus for correcting a corrupted time code recovered from a broadcast signal receives a set of data records, each record containing a SID, a time code, and a read time. The apparatus detects the time codes that are corrupt by calculating and comparing time code intervals to read time intervals. More particularly, a time code interval is calculated between a first time code and a second time code and a read time interval is calculated between a first read time that corresponds to the first time code and a second read time that corresponds to the second time code. If the intervals are approximately equal, then the values may be validated. Conversely, if the intervals are not approximately equal, then one or both of the values are identified as being corrupt. When a corrupt time code, such as the second time code is identified, the apparatus calculates a corrected time code by adding the read time interval to the first time code. The corrected time code may then be used to validate other time codes that are subsequently extracted from the broadcast signal. The validated time code(s) may be transmitted in place of the erroneous time codes and with all of the collected data to a central facility for use in measuring the viewing habits of the inhabitants of a dwelling in which the apparatus is installed.

Figure 1:
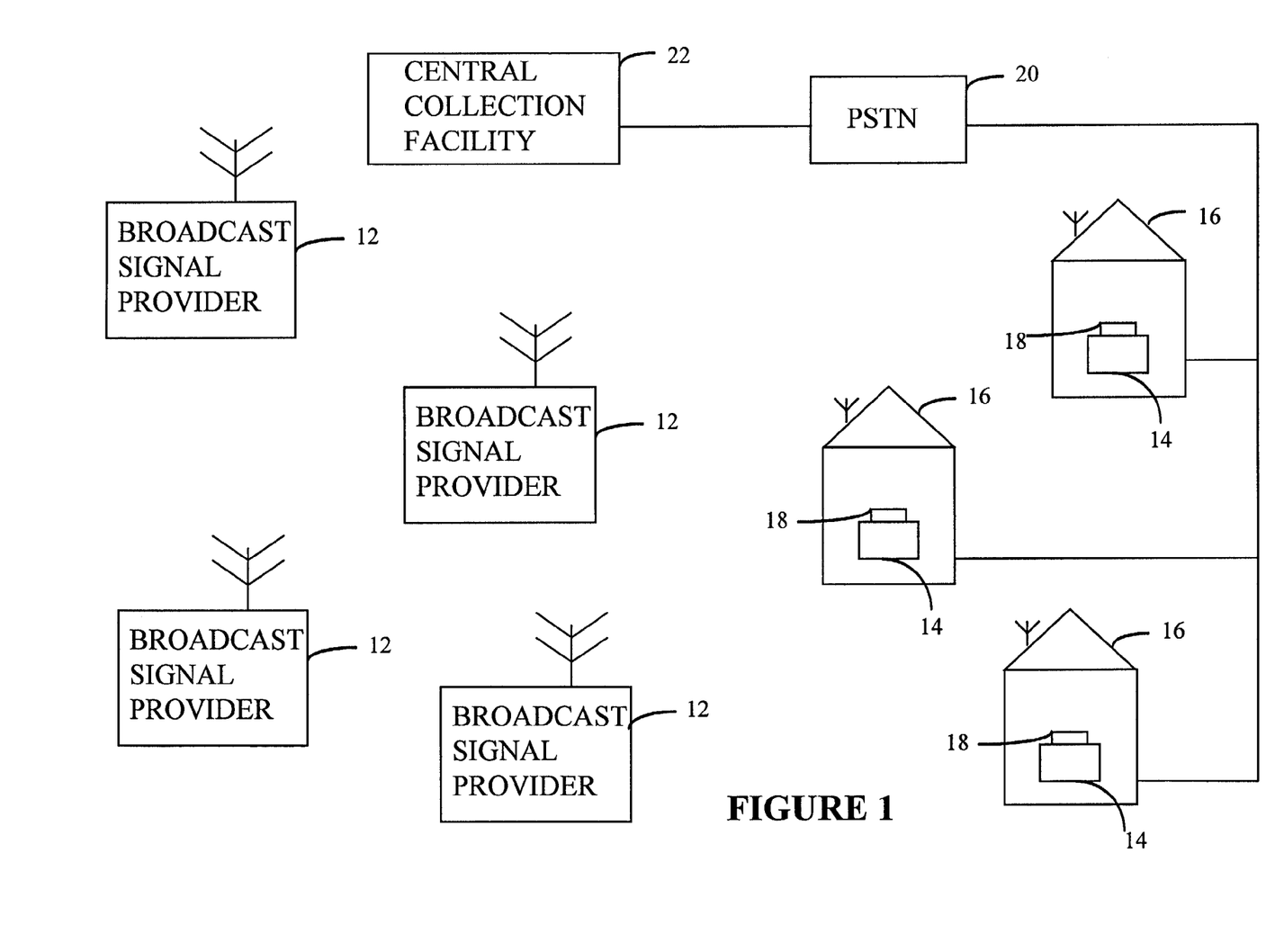
FIG. 1 is block diagram of a broadcast measuring system having a plurality of broadcast signal providers that transmit broadcast signals to a plurality of reception sites, each having an audience measuring apparatus according to one aspect of the invention.

Referring now to drawings wherein like reference numerals represent like objects, and turning specifically to FIG. 1, a broadcast measuring system 10 includes a plurality of broadcast signal providers 12 each transmitting a broadcast signal for reception at a plurality of consumer devices 14 installed in a plurality of reception sites such as consumer dwellings 16. The broadcast signal includes encoded broadcast identification codes and may be either an audio and/or video signal formatted for television and/or radio and/or a network such as the Internet. As a result, the broadcast signal providers 12 may be television or radio stations, and the consumer devices 14 may be televisions or radios. Alternatively, the broadcast signal may be any type of signal now known or later devised for transmitting broadcast information. Likewise, the consumer devices 14 may be implemented using any type of signal receiver. An audience measuring device 18 is coupled to each of the consumer devices 14 and stores the broadcast identification codes extracted from the broadcast signals that are received and displayed (or otherwise played) at the consumer device 14. The stored broadcast identification codes are later transmitted via a public switched telephone network (PSTN) 20 to a central facility 22 where the codes are used to measure the viewing and/or listening habits of the consumers. Although described as being transmitted via the PSTN 20, the broadcast data may instead be transmitted via any number of communication methods including, for example, a cable television cable and a wireless telephone. Of course, the integrity of the data must be protected such that a wireless telephone may only be useful where wireless telephone communication is known to be extremely reliable.

Figure 2:
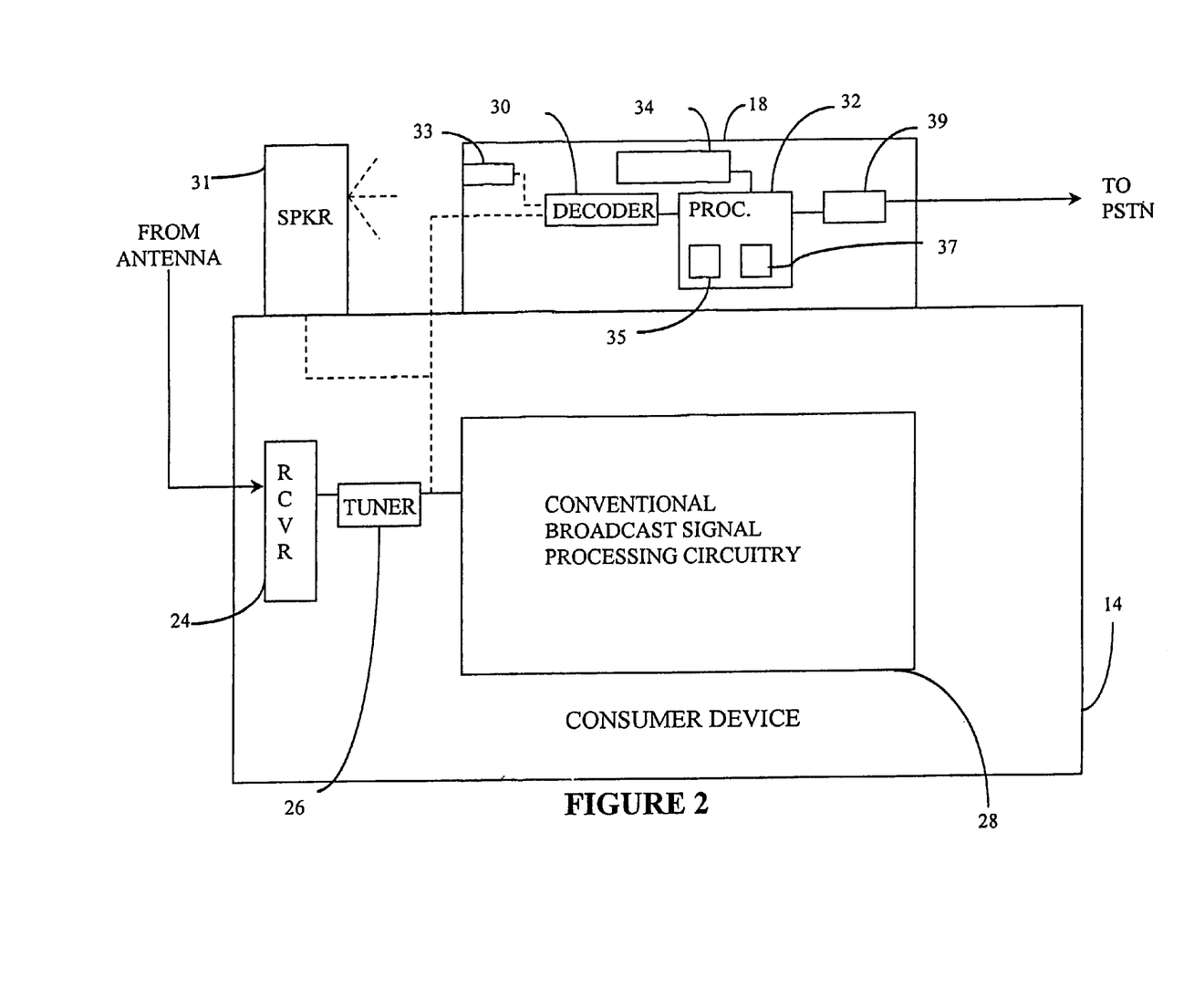
FIG. 2 is a block diagram of the audience measuring apparatus of FIG. 1 and a consumer device for displaying or otherwise playing the broadcast signals according to another aspect of the invention.

Turning now to FIG. 2, the consumer device 14 may be a television having a receiver 24 at which a broadcast signal is received. A tuner 26 causes the receiver 24 to tune to and receive a broadcast signal from any of the broadcast program providers 12. The received *broadcast signal is subsequently transmitted to a conventional television circuit 28 that processes the signal for display at a television display (not shown). Alternatively, the signal may be routed to a video cassette recorder (not shown) for recording thereby enabling display at a later time. In addition to routing the received signal to the conventional television circuit 28, the received signal is simultaneously routed to a decoder 30 disposed in the audience measuring device 18. As shown in FIG. 2, the signal may be routed to the decoder 30 via a hard wired connection or, an portion of the signal may instead be supplied first to a speaker 31 that processes and then plays the signal which is then detected at a microphone 33 that routes the detected signal to the decoder 30. As will be appreciated by one having ordinary skill in the art, due to the ability of the present invention to collect data provided in an audio signal, the present invention may be used to obtain audience measurement data in any number of broadcast media systems including radios, movie theaters, televisions and the Internet.

The decoder 30 extracts the broadcast identification codes from the broadcast signal and supplies the broadcast identification codes to a processor 32. The processor 32 may be implemented using a Texas Instruments digital signal processor model no. TMS 320VC33 and the decoder 30 may be implemented using software such as NAES II or NAES III that is executed by the processor 32.

The processor 32 supplements each record extracted from the broadcast signal by adding a read time obtained from a local clock 34. The format of each record may depend on the type of signal in which the record is embedded. For example, a record extracted from an audio signal may contain as many as fifty data bits. The read times are added to the records as each record is decoded and supplied to the processor 32 such that each read time indicates the time at which the corresponding record was decoded. The processor 32 processes the resulting broadcast identification records, each having a time code, a corresponding SID, and a read time added by the processor 32, and stores the processed data in a either of a memory device 35 or a temporary memory buffer 37, both of which may, but need not be, internal to the processor 32. At a later time, the processor 32 causes the stored records to be supplied to a data communication device 39 for transmission to the central data collection facility 22 at predetermined intervals or in response to a query. The communication device 39 may be implemented using, for example, a modem coupled to a telephone that converts the data to a format suitable for transmission via the PSTN 20. Alternatively, the communication device 39 may be implemented using any device that enables communication between the audience measurement apparatus and the central data collection facility.

Figure 3:
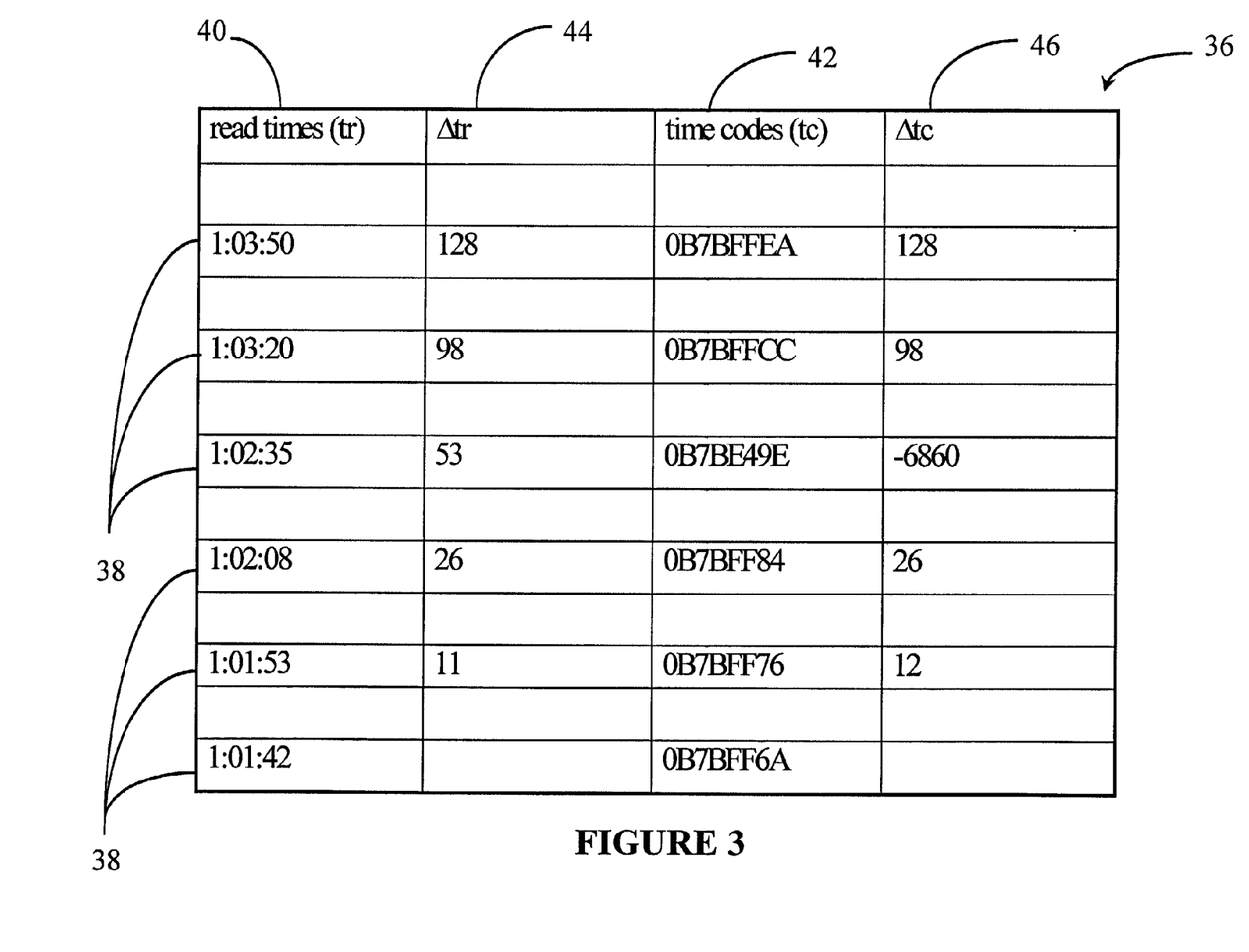
FIG. 3 is a table having a set of data records and a set of time intervals for use by the measuring apparatus of FIG. 1.

Referring also to FIG. 3, a table 36 stored in memory 35 contains a sequence of records 38 representative of the data records extracted by the decoder 30 and supplemented by the processor 32. For clarity, the SID and other data fields typically associated with the data records have been omitted from FIG. 3. A first column of the table 36 contains a set of read times 40, as obtained from the local clock 34, and a third column contains a set of time codes 42 that have been extracted from the broadcast signal using the signal decoder 30. The time codes 42 are formatted as hexadecimal numbers representing a quantity of seconds that have elapsed since an epochal time. Each of the time codes 42 corresponds to a unique one of the read times 40 and is displayed in the same record 38 as the read time 40 with which it is uniquely associated.

For illustrative purposes, the table 36 also includes a second column labeled $\Delta tr$ and a fourth column 24 labeled $\Delta tc$ that contain a set of time intervals 44, 46 between read times 40 and between time codes 42, respectively. Specifically, the time interval 44 associated with the most recently acquired record 38, i.e., the topmost record, is calculated by subtracting the read time 40 associated with the earliest acquired record, i.e., the bottommost record, from the read time 40 associated with the most recently acquired record. Likewise, the time code interval $\Delta tc$ 46 associated with the most recently acquired record is calculated by subtracting the time code 42 associated with the earliest acquired record 38, from the time code 42 associated with the most recently acquired record 38.

Because the time codes 42 are encoded into the broadcast signal at the same rate that they are decoded from the broadcast signal, and because the rate at which the time codes 42 are decoded is represented by the read times 40, the time codes 42 will track the read times 40, provided that the time codes 42 are error free. More particularly, the intervals $\Delta tr$ 44 between the read times 40 should approximately equal the intervals $\Delta tc$ 46 between the time codes 42. When the time codes 42 track the read times 40 in this manner, the two data sets of read times and time codes are in a state of time lock, i.e., the data sets increment in a lock step fashion. When the read times 40 do not track the time codes 42, the data sets, tr and tc, are no longer time locked. Thus, when corresponding read time intervals 44 and time code intervals 46 are within an acceptable tolerance of each other, e.g., plus or minus one second, the two data sets of read times and time codes are time locked. When the corresponding read time and time code intervals 44, 46 are time locked, the time codes 42 associated with the time code intervals $\Delta tc$ 46 are validated as being error free.

By way of example, the time code and the read time data sets are time-locked during the time period associated with the first and second records of table 36, wherein the bottommost record is the first record and the records are numbered in an ascending fashion such that the topmost record is the sixth record, because the read time interval, $\Delta tr$ 44 between these records is approximately equal to the time code interval $\Delta tc$ 46 associated with these records. In contrast, the data sets are not time-locked during the time period associated with the third record 38 because the corresponding read time interval $\Delta tr$ 44 and time code interval $\Delta tc$ 46 are not approximately equal. Specifically, a time code 40 associated with the fourth record 38 is earlier than the time code 42 of the previous, third record 38 thereby causing the read time interval 44 and time code interval 46 associated with the fourth record to be mismatched or unequal. The read time interval 44 is approximately equal to the corresponding time code interval 46 for the fourth, fifth and sixth records such that the data sets are again time-locked.

Figure 4A:
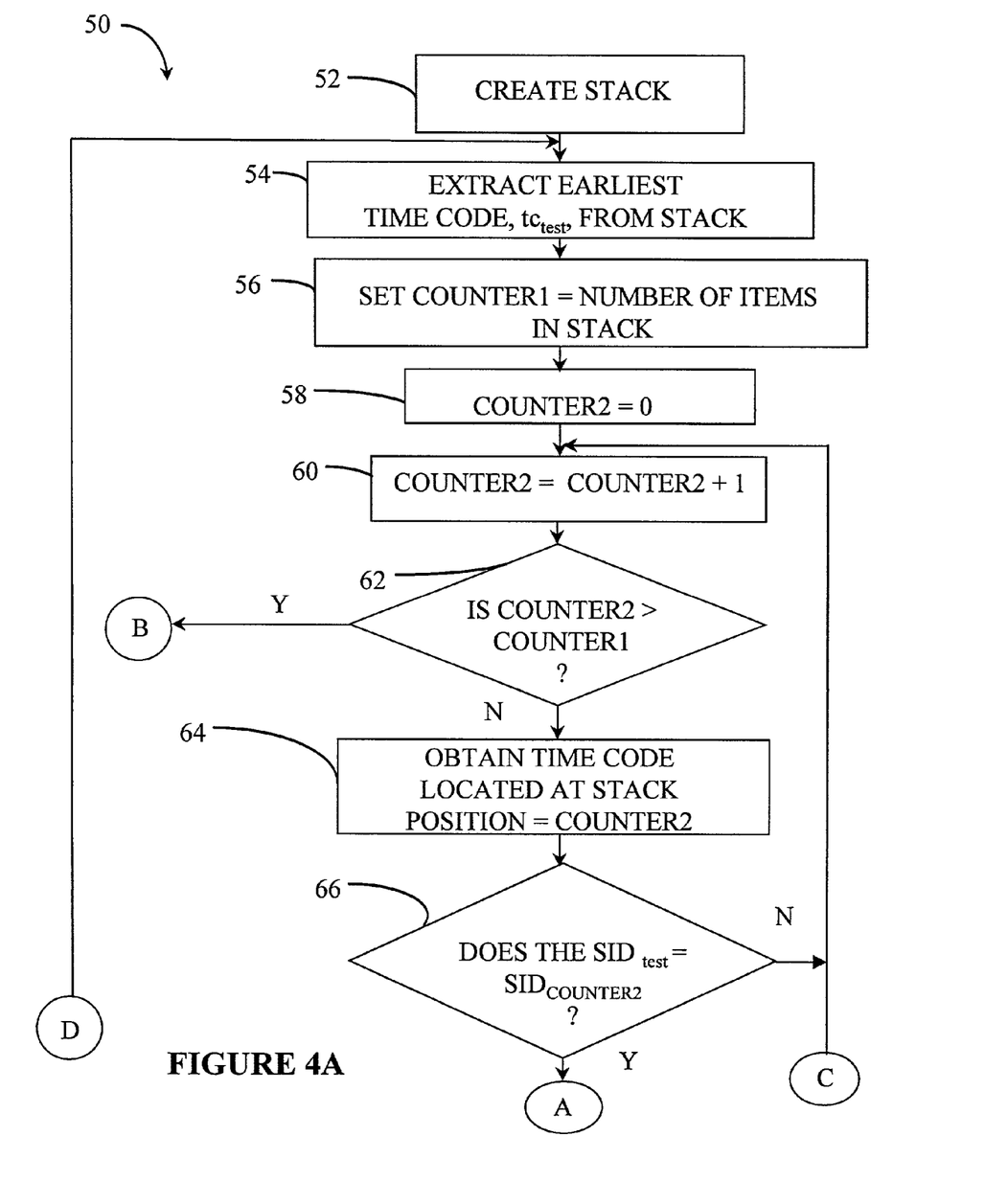
FIGS. 4A and 4B include a flow chart of a method performed by the measuring apparatus of FIG. 1 for identifying and correcting erroneous time codes according to yet another aspect of the invention.

Referring now to FIG. 4A, a timestamp validation method 50 for detecting and correcting for such decoder errors may be implemented using, for example, a software program stored in the memory 35 and executed by the processor 32. The method 50 may begin at a step 52 where a data stack is created using time codes 42 that have been extracted from a broadcast signal. Specifically, the time codes 42 extracted from the signal are stacked in the order in which they were received such that the time code 42 received earliest is located at the bottom of the stack. Next, at a step 54, the earliest received time code is removed from the bottom of the stack and stored in the memory buffer 37. As is described in greater detail below, the steps of the method 50 operate to test the earliest received time code for validity. Thus, for purposes of describing the method 50, the earliest received time code is denoted $tc_{test}$.

Next at a series of steps 56, 58 and 60, a set of counters, COUNTER1 and COUNTER2 are initialized and COUNTER2 is incremented. Specifically, at the step 56, COUNTER1 is set equal to the number of time codes stored in the stack. At a later step in the method 50, COUNTER1 will be used to ensure that the earliest received time code, $tc_{test}$, has been compared against every time code stored in the stack. At the step 58, the COUNTER2 is set equal to zero and then incremented by one at the step 60. The value stored in COUNTER2 represents the position, in the stack, of the time code being compared to the earliest time code $tc_{test}$ wherein the bottommost time code in the stack is located in the first position, the time code immediately above the bottommost time code is located in the second position and so on.

After the step 60, the method 50 continues at a step 62 where COUNTER1 is compared to COUNTER2 to determine whether each of the time codes in the stack have been compared to the earliest time code, $tc_{test}$. Specifically, if COUNTER2 is greater than COUNTER1, then all of the time codes in the stack have been compared to $tc_{test}$ and the method branches to a step 74 and steps subsequent thereto where $tc_{test}$ is subjected to a set of final processing steps as is described in further detail below. If COUNTER2 is not greater than COUNTER1, then the method continues at a step 64 where the time code located in the stack position equal to the value of COUNTER2 is copied from the stack for use in validating $tc_{test}$. For example, if COUNTER2=1, then the time code located in the first position of the stack is copied from the stack and stored in memory as $tc_1$. Next, at a block 66, the SID associated with $tc_{test}$ is compared to the SID associated with $tc_1$. If the SID values do not match, i.e., $SID_{test} \neq SID_1$, then the time code $tc_1$, is not associated with the same broadcast program as $tc_{test}$ such that $tc_1$ may not be used to validate $tc_{test}$. As a result, the method loops back to the step 60 and steps subsequent thereto where COUNTER2 is again incremented so that the time code located at the next position in the stack may be obtained for comparison to, and possible validation of, $tc_{test}$.

Figure 4B:
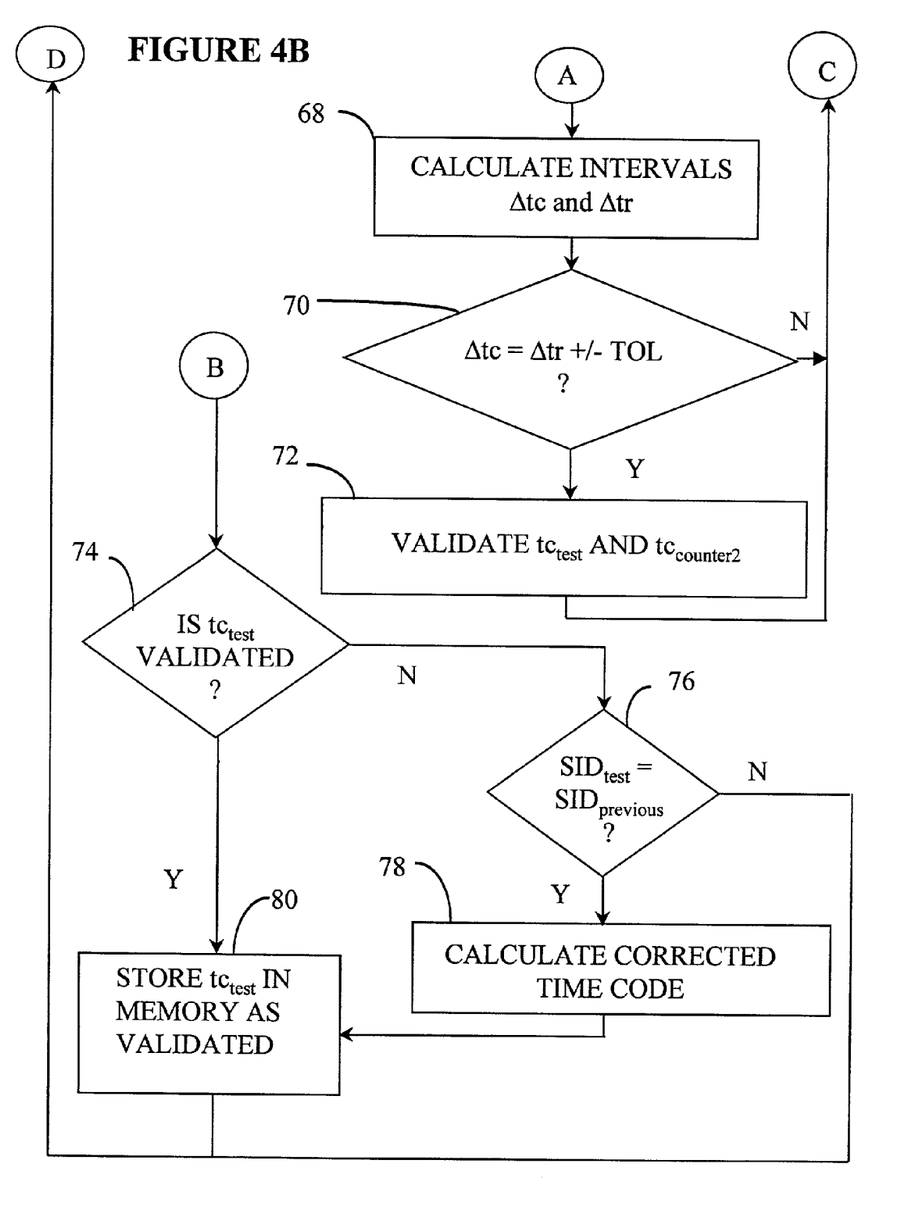

Referring also to FIG. 4B which aligns with FIG. 4A at connection points A, B, C and D, if the SID values match, i.e., $SID_{test}=SID_1$, then the time code, $tc_1$, is associated with the same broadcast program as $tc_{test}$ such that $tc_1$ may be used to validate $tc_{test}$. As a result, the method 50 continues at a step 68 where time interval data is calculated. More particularly, at the step 68, an interval denoted $\Delta tc$ between the time codes, $tc_{test}$ and $tc_1$, is calculated and an interval denoted $\Delta tr$ between a read time denoted $tr_{test}$ that corresponds with the time code $tc_{test}$ and a read time denoted $tr_1$ that corresponds with $tc_1$.

Next, at a step 70, the interval $\Delta tr$ is compared to the interval $\Delta tc$. If the interval $\Delta tc$ is equal to the interval $\Delta tr$, within an allowable tolerance (TOL), i.e., $\Delta tr-TOL<\Delta tc<\Delta tr+TOL$, then both $\Delta tc_{test}$ and $\Delta tc_1$ are valid and are marked valid at a step 72. For example, the time codes $\Delta tc_{test}$ and $\Delta tc_1$ and $\Delta tc_1$ may be marked valid by setting a validity flag associated with each value. Alternatively, any data association method may be used to indicate that the values $\Delta tc_{test}$ and $\Delta tc_1$ and $\Delta tc_1$ are valid.

If instead the interval $\Delta tc$ is not equal to the interval $\Delta tr$, within an allowable tolerance (TOL), i.e., $\Delta tc>\Delta tr+TOL$ or $\Delta tc<\Delta tr-TOL$, then one or both of $\Delta tc_{test}$ and $\Delta tc_1$ are invalid and the method branches back to the step 60 and the steps subsequent thereto, as described above. Likewise, after the values $\Delta tc_{test}$ and $\Delta tc_1$ have been marked valid at the step 72, the method branches back to the step 60.

As described above, if, at the step 62, COUNTER2 is greater than COUNTER1, then all of the time codes in the stack have been compared to $\Delta tc_{test}$ and the method 50 continues at the step 74 where the processor 32 determines whether $tc_{test}$ has been validated by the portion of the method 50 including the steps 60–72. If $tc_{test}$ has not been validated, thereby indicating that $tc_{test}$ is erroneous, then the method continues at the step 76 where $tc_{test}$ is corrected. Specifically, at the step 76, $SID_{test}$ is compared to an SID, denoted $SID_{previous}$, that corresponds to the most recently validated time code denoted $tc_{previous}$. The value of $tc_{previous}$ is equal to the value of the time code that was most recently removed from the stack for processing by the method 50 and that was validated during the most recent of the previous iterations of the method 50. If the SID values are equal, i.e., $SID_{test}=tc_{previous}$ thereby indicating that the time codes, $tc_{test}$ and $tc_{previous}$, were extracted from the same broadcast program, then a read time interval $\Delta tr_{previous}$ between a read time denoted $tr_{previous}$ that corresponds to the time code, $tc_{previous}$, and the read time, $tr_{test}$, that corresponds to the time code $tc_{test}$ is calculated at a step 78. At the step 78, the read time interval $\Delta tr_{previous}$ is also added to the value of $tc_{previous}$ to obtain a corrected value for the time code $tc_{test}$ which is subsequently stored in a list of validated time codes, at a step 80, for later retrieval and usage in calculating corrected time codes as necessary. After storing the value of $tc_{test}$, the method branches back to the step 54 where the next time code value is extracted from the bottommost position in the stack and the method continues at the steps subsequent thereto as described above.

If at the step 74, the processor 32 determines that the value of $tc_{test}$ has already been validated, then the method continues at the step 80 where the value of $tc_{test}$ is stored for later usage as described above.

While the invention has been discussed in terms of preferred and specific embodiments, it should be appreciated by those of skill in the art that the invention is not so limited. For example, those having ordinary skill in the data processing arts will recognize that although the method 50 has been described as employing two separate memory devices 35, 37, the method could be carried out equally well with a single memory device. Moreover, it will be recognized that it is not necessary that the read time intervals used in the calculation be calculated between an earliest acquired read time value and all of the other read time values. Instead the calculations may be performed using read time data associated with any size interval provided, of course, that the corresponding time code interval to which the read time interval is compared is calculated over the same interval.

The processor 32 may further be programmed to enable the transfer of the data values stored in the memory 35 to the central data collection facility 22. (See FIG. 1). Specifically, at regular intervals, in response to a query from the central data collection facility 22 or when a predetermined amount of data has been collected, the processor 32 may cause the data to be transmitted to the communication device 39, and may cause the communication device 39 to transfer the data to the central collection facility 22 via the PSTN 20.

In addition, the technique used to calculate the corrected time code values need not be dependent upon the read time data and time code data returning to time lock. Instead, the read time data collected when the system was in an earlier state of time lock may be used to calculate a corrected time code value for a later-decoded, erroneous time code value.

Further, although the apparatus is described herein as having a processor, a decoder and a time clock, a set of memories and a device that enables communication with the central facility, one or more of the foregoing components may be replaced with one or more devices that perform equivalent functions. For example, the data processing performed by the processor may instead be performed using any combination of electronic circuitry adapted to implement the method of the present invention including, for example, an application specific integrated chip, or a complex programmable logic device. As a further example, the data processing may be performed by an electronic circuit containing components such as a comparator, an adder/subtractor and a set of suitable logic gates. Likewise, although the apparatus and the consumer device are described as being separate components, one or more of the components disposed in the apparatus may be disposed in the consumer device and vice versa.

Further, the present invention may be used to process audience measurement data broadcast from any source such as land-based television/radio broadcasters and satellite-based broadcast distribution sites. Moreover, the apparatus/method described herein may be used to process data supplied in any broadcast signal format now known or later devised including video signals, audio signals, television signals, radio signals, and both hard-wired and wireless Internet signals.

Thus, the embodiments explained herein are provided by way of example, and there are numerous modifications, variations and other embodiments that may be employed that would still be within the scope of the present invention.

What is claimed is:

1. An apparatus for processing audience measurement data, said audience measurement data including a plurality of sequential data records, each of said data records including a time code retrieved from a broadcast signal, and a read time that corresponds to said time code such that a set of first intervals between said read times are mathematically related to a corresponding set of second intervals between said time codes, provided that said time codes are not corrupted, said apparatus comprising:
   a data input port for receiving said plurality of data records; and
   a processor coupled to said data input port, said processor being adapted to determine the magnitudes of said first and second intervals, wherein said processor is adapted to compare magnitudes of said first and second intervals to identify one or more of said time codes that are corrupted and to identify one or more of said time codes that are not corrupted, and wherein said processor is further adapted to calculate a corrected time code for each said time code that is corrupted.

2. The apparatus of claim 1, wherein said processor calculates said corrected time code by adding one of said first intervals to one of said time codes that are not corrupted.

3. The apparatus of claim 1, wherein said processor calculates said corrected time code by subtracting one of said first intervals from one of said time codes that are not corrupted.

4. The apparatus of claim 1, wherein said first intervals are between consecutive read times and said second intervals are between consecutive time codes.

5. The apparatus of claim 1, wherein said first intervals are between non-consecutive read times and said second intervals are between non-consecutive time codes.

6. The apparatus of claim 1, further comprising a memory coupled to said processor, said memory being adapted to store said data records.

7. The apparatus of claim 1, further comprising a communication device, said communication device being adapted to communicate said data records, including said corrected time codes, to a central data collection facility.

8. The apparatus of claim 1, further comprising a decoder coupled to said data input port, said decoder being adapted to extract said data records from said broadcast signal.

9. The apparatus of claim 1, further comprising a clock coupled to said processor via said data input port, said clock being adapted to generate said read times.

10. The apparatus of claim 1, further comprising a display device for displaying said broadcast signal.

11. The apparatus of claim 1, wherein said broadcast signal comprises an audio signal.

12. The apparatus of claim 1, wherein said broadcast signal comprises a video signal.

13. A method for identifying and correcting one or more of a plurality of time codes extracted from a broadcast signal, said method comprising the steps of:
recording a set of read times, each of said read times corresponding to one of said time codes, and each of said read times indicating when said corresponding time code was extracted from said broadcast signal;
determining a set of first intervals between said read times;
determining a set of second intervals between said time codes, each of said second intervals corresponding to one of said first intervals;
comparing each of said first intervals to each corresponding ones of said second intervals to determine whether said first intervals are approximately equal to said corresponding second intervals;
identifying a subset of said second intervals that are not approximately equal to a corresponding subset of said first intervals based on a result of said comparing, wherein each of said subset of second intervals are associated with at least one corrupted time code; and
calculating a corrected time code for said at least one corrupted time code.

14. The method of claim 13, wherein the step of calculating a corrected time code comprises the step of adding a magnitude of one of said first intervals to one of said time codes.

15. The method of claim 13, further comprising the step of receiving said time codes extracted from said broadcast signal.

16. The method of claim 13, wherein said step of calculating a corrected time code for said at least one corrupted time code is based on a magnitude of one of said first intervals that is not included in said subset of said first intervals.

17. The method of claim 13, further comprising the steps of storing said read times and storing said time codes.

18. The method of claim 13, further comprising the step of communicating said corrected time code to a central data collection facility.

19. The method of claim 13, further comprising the step of decoding said time codes from said broadcast signal.

20. A storage medium for storing software for detecting and correcting one or more of a plurality of time codes extracted from a broadcast signal, the software being computer readable and the software including instructions for causing a computer to:
receive a set of time codes;
receive a set of read times, each of said read times corresponding to one of said time codes, and each of said read times indicating when said corresponding time code was extracted from a broadcast signal;
calculate a set of first intervals between said read times;
calculate a set of second intervals between said time codes, each of said second intervals corresponding to one of said first intervals;
compare each of said first intervals to each corresponding second interval to determine whether said first intervals are approximately equal to said corresponding second intervals;
identify a subset of said second intervals that are not approximately equal to a corresponding subset of said first intervals based on a result of said comparison, wherein each of said subset of said second intervals are associated with at least one corrupted time code; and,
calculate a corrected time code for said at least one corrupted time code.

21. The storage medium of claim 20, the software further including instructions for causing a computer to calculate said corrected time code by adding one of said first intervals to one of said time codes that is not corrupted.

22. The storage medium of claim 20, the software further including instructions for causing a computer to calculate said corrected time code by subtracting one of said first intervals to one of said time codes that is not corrupted.

23. The storage medium of claim 20, wherein said first intervals are calculated between consecutive read times and said second intervals are calculated between consecutive time codes.

24. The storage medium of claim 20, wherein said first intervals are calculated between non-consecutive read times and said second intervals are calculated between non-consecutive time codes.

25. The storage medium of claim 20, the software further including instructions for causing a computer to store said read times and store said time codes.

26. The storage medium of claim 20, the software further including instructions for causing a computer to cause said corrected time code to be communicated to a central data collection facility.

27. The storage medium of claim 20, the software further including instructions for causing a computer to decode said time codes from said broadcast signal.

28. An apparatus for processing audience measurement data, said apparatus comprising:
means for receiving a plurality of time codes extracted from a broadcast signal; means for recording a plurality of read times, each of said read times corresponding to one of said time codes;
means for calculating a set of first intervals between said read times, wherein each first interval is calculated by determining a difference between two of said read times;
means for calculating a set of second intervals between said time codes, wherein each second interval is calculated by determining a difference between two of said time codes, and wherein each of said second intervals corresponds to one of said first intervals;
means for comparing each of said first intervals to each of said corresponding second intervals to determine whether one or more of said time codes are corrupted.

29. The apparatus of claim 28, wherein said means for comparing said first intervals to said corresponding second intervals further comprises means for identifying a subset of said second intervals that are not approximately equal to said corresponding first intervals.

30. The apparatus of claim 28, wherein said first intervals are calculated by determining a difference between two of said read times that are consecutive and wherein said second intervals are calculated by determining a difference between two of said time codes that are consecutive.

31. The apparatus of claim 28, wherein said first intervals are calculated by determining a difference between two of said read times that are not consecutive and wherein said second intervals are calculated by determining a difference between two of said time codes that are not consecutive.

32. The apparatus of claim 28, further comprising means for calculating a corrected time code for at least one of said two time codes used to calculate each of said subset of second intervals.

33. The apparatus of claim 32, wherein said means for calculating a corrected time code further comprises a means for adding one of said first intervals to one of said time codes, wherein said one of said first intervals corresponds to one of said second intervals included in said subset of second intervals.

34. The apparatus of claim 32, wherein said means for calculating a corrected time code further comprises means for subtracting one of said first intervals from one of said time codes, wherein said one of said first intervals corresponds to one of said second intervals included in said subset of second intervals.

35. The apparatus of claim 32, further comprising:
means for communicating said corrected time code to a central data collection facility.

36. A method of identifying one or more corrupted time codes, the method comprising steps of:
receiving a set of time codes extracted from a broadcast signal;
recording a set of read times, each of said read times corresponding to one of said time codes and each of said read times indicating when said corresponding time code was extracted from said broadcast signal;
calculating a set of first intervals between said read times;
calculating a set of second intervals between said time codes, said second intervals corresponding to said first intervals;
comparing each of said first intervals to corresponding ones of said second intervals to determine whether said first intervals are approximately equal to said corresponding second intervals; and,
identifying one or more of said time codes that are corrupted based on a result of the comparing.

37. The method of claim 36, wherein the step for identifying said one or more of said time codes that are corrupted comprises a step for identifying a subset of said second intervals that are not approximately equal to a corresponding subset of said first intervals based on a result of the comparing.

38. The method of claim 36, further comprising a step for calculating a corrected time code for at least one of said time codes that is corrupted.

39. The method of claim 38, wherein the step for calculating a corrected time code further comprises a step for adding one of said first intervals to one of said time codes.

40. The method of claim 38, wherein the step for calculating a corrected time code further comprises a step for subtracting one of said first intervals from one of said time codes.

41. The method of claim 36, wherein the step of calculating said first intervals is performed using consecutive read times and the step of calculating said second intervals is performed using consecutive time codes.

42. The method of claim 36, wherein the step of calculating said first intervals is performed using non-consecutive read times and the step of calculating said second intervals is performed using non-consecutive time codes.

43. An apparatus for processing audience measurement data, said audience measurement data including a plurality of time codes and a plurality of read times, each of said read times corresponding to one of said time codes, the apparatus comprising:
an input port for receiving a plurality of data records, each data record comprising one of said time codes and a corresponding one of said read times; and
a processor adapted to determine when said time codes and said corresponding read times are time locked such that a first time code and a first read time included in a first data record have increased by an approximately equal amount relative to a second read time and a second time code included in a second data record, said first data record being received at said input port later than said second data record, wherein said processor is further adapted to determine when said time codes and said corresponding read times are not time locked such that a third time code and a third read time included in a third data record have not increased by an approximately equal amount relative to a fourth read time and a fourth time code included in a fourth data record, said third data record being received at said input port later than said fourth data record, and wherein said processor is further adapted to determine when said time codes and said read time experiences one or more transitions between being time locked and not being time locked and to use said transitions to identify one or more of said time codes that are corrupted, and further wherein said processor is adapted to calculate one or more corrected time codes for said corrupted time codes.

44. The apparatus of claim 43, wherein said third time code is corrupted, said processor is further adapted to use an amount by which said fourth read time increases relative to said third read time to calculate a corrected time code to replace said third time code.

45. The apparatus of claim 43, wherein said processor is further adapted to calculate said one or more corrected time codes by adding one of said first intervals to one of said time codes.

46. The apparatus of claim 43, wherein said first data record and said second data record are consecutive.

47. The apparatus of claim 43, wherein said first data record and said second data record are not consecutive.

48. An apparatus for processing audience measurement data, said audience measurement data including a plurality of time codes and a plurality of read times, each of said read times corresponding to one of said time codes, the apparatus comprising:
an input port for receiving a plurality of data records, each data record including one of said time codes and a corresponding one of said read times;
a processor adapted to determine whether said time codes and said corresponding read times are time locked, and to identify one or more of said time codes that are corrupted based on whether said time codes and said corresponding read times are time locked, and to calculate one or more corrected time codes to replace one or more of said corrupted time codes corrupted.

49. The apparatus of claim 48, wherein said processor is adapted to determine whether said time codes and said corresponding read times are time locked by calculating a set of first intervals between said read times and a set of second intervals between said time codes, each of said first intervals corresponding to one of said second intervals, and by comparing each of said first intervals to each of said corresponding second intervals.

50. The apparatus of claim 49, wherein said processor adds one or more of said first intervals to one of said time codes to calculate said corrected time codes.

51. The apparatus of claim 49, wherein said processor subtracts one or more of said first intervals from one of said time codes to calculate said corrected time codes.

52. The apparatus of claim 48, wherein said processor is adapted to identify said corrupted time codes by identifying said first intervals that are not approximately equal to said corresponding second intervals.

53. The apparatus of claim 52, wherein said first intervals are approximately equal to said second intervals if said first intervals are within a predetermined tolerance of said second intervals.

54. The apparatus of claim 53, wherein said predetermined tolerance is equal to one second.

55. A method of processing audience measurement data, said method comprising the steps of:
receiving a plurality of time codes;
generating a plurality of read times, said read times corresponding to said time codes;
determining whether said time codes and said corresponding read times are time locked;
identifying one or more corrupted time codes depending on whether said time codes and said corresponding read times are time locked; and
calculating one or more corrected time codes to replace one or more said corrupted time codes.

56. The method of claim 55, wherein said step of determining whether said time codes and said corresponding read times are time locked comprises the steps of; calculating a set of first intervals between said read times; calculating a set of second intervals between said time codes, said second intervals corresponding to said first intervals; comparing said first intervals to said corresponding second intervals; and identifying a subset of said second intervals that are not approximately equal to said corresponding first intervals.

57. The method of claim 56, wherein said step of identifying one or more corrupted time codes depending on whether said time codes and said corresponding read times are time locked comprises the step of: identifying one of said times codes located on either side of one of said subset of said second intervals as being one of said corrupted time codes.

58. The method of claim 56, wherein said step of calculating one or more corrected time codes to replace one or more said corrupted time codes comprises the step of: adding one of said first intervals that corresponds to the subset of said second intervals to one of said time codes.

59. An apparatus for processing audience measurement data, said audience measurement data including a plurality of sequential data records, each of said data records including a time code retrieved from a broadcast signal, and a read time that corresponds to said time code such that a set of first intervals between said read times are mathematically related to a corresponding set of second intervals between said time codes, provided that said time codes are not corrupted, said apparatus comprising:
a means for receiving said plurality of data records; and
a means for processing said data records, said means for processing being coupled to said means for receiving, and said means for processing being adapted to determine the magnitudes of said first and second intervals, compare magnitudes of said first and second intervals to identify one or more of said time codes that are corrupted, to identify one or more of said time codes that are not corrupted, and to calculate a corrected time code for each said time code that is corrupted.

60. The apparatus of claim 59, wherein said means for processing calculates said corrected time code by adding one of said first intervals to one of said time codes.

61. The apparatus of claim 59, wherein said means for processing calculates said corrected time code by subtracting one of said first intervals from one of said time codes.

62. The apparatus of claim 59, further comprising a storage means coupled to said means for processing, said storage means being adapted to store said data records.

63. The apparatus of claim 59, further comprising a communication means coupled to said means for processing, said communication means being adapted to communicate said data records, including said corrected time codes, to a central data collection facility.

64. The apparatus of claim 59, further comprising a decoding means coupled to said means for receiving, said decoding means being adapted to extract said data records from said broadcast signal.

65. The apparatus of claim 59, further comprising a timing means coupled to said means for processing via said means for receiving, said timing means being adapted to generate said read times.

66. The apparatus of claim 59, further comprising a display means for displaying said broadcast signal.

67. The apparatus of claim 59, wherein said broadcast signal comprises an audio signal.

68. The apparatus of claim 59, wherein said broadcast signal comprises a video signal.

* * * * *